(12) United States Patent
Arihara

(10) Patent No.: US 7,261,014 B2
(45) Date of Patent: Aug. 28, 2007

(54) BACKLASH PREVENTING STRUCTURE FOR STEERING COLUMN

(75) Inventor: Kouji Arihara, Kosai (JP)

(73) Assignee: Fujikiko Kabushiki Kaisha, Shizuoka-ken (JP)

( * ) Notice: Subject to any disclaimer, the term of this patent is extended or adjusted under 35 U.S.C. 154(b) by 357 days.

(21) Appl. No.: 10/947,233

(22) Filed: Sep. 23, 2004

(65) Prior Publication Data

US 2005/0066761 A1   Mar. 31, 2005

(30) Foreign Application Priority Data

Sep. 29, 2003  (JP) .............................. 2003-336642

(51) Int. Cl.
*B62D 1/18* (2006.01)
(52) U.S. Cl. ....................................... 74/493
(58) Field of Classification Search ................. 74/440, 74/492, 493; 280/775; 464/172, 176; 403/109.3; 267/242, 30, 160
See application file for complete search history.

(56) References Cited

U.S. PATENT DOCUMENTS

| | | | | |
|---|---|---|---|---|
| 3,283,604 A | * | 11/1966 | Meyers .......................... | 74/493 |
| 3,487,710 A | * | 1/1970 | Fergle ........................... | 74/492 |
| 3,491,614 A | * | 1/1970 | Demske et al. ................ | 74/493 |
| 4,911,034 A | * | 3/1990 | Kulczyk et al. ............... | 74/492 |
| 5,152,627 A | * | 10/1992 | Arnold ..................... | 403/109.3 |
| 6,273,468 B1 | * | 8/2001 | Bohner et al. ............... | 280/775 |
| 2006/0230863 A1 | * | 10/2006 | Rouleau et al. ............... | 74/492 |

FOREIGN PATENT DOCUMENTS

| JP | 6-74562 | | 10/1994 |
|---|---|---|---|
| JP | 2006205956 A | * | 8/2006 |

* cited by examiner

*Primary Examiner*—Thomas R. Hannon
*Assistant Examiner*—Terence Boes
(74) *Attorney, Agent, or Firm*—Westerman, Hattori, Daniels & Adrian, LLP.

(57) ABSTRACT

A backlash preventing structure for a steering column is provided for reducing the cost by reducing the number of parts and improving the ease of assembly, and for preventing hammering noise. The steering column has a cylindrical movable jacket slidably fitted into an outer cylindrical housing, the outer cylindrical housing having three holes formed therethrough in an axial direction, a steering shaft swingably disposed within the movable jacket, and a steering wheel secured to one end of the steering shaft. The backlash preventing structure, which prevents backlash of the movable jacket against the outer cylindrical housing, comprises a pair of press members each fitted into a left or a right side hole of the outer cylindrical housing, and a leaf spring fixed to the outer cylindrical housing with a screw screwed into a central hole of the outer cylindrical housing for urging the press members onto an outer peripheral surface of the movable jacket.

4 Claims, 5 Drawing Sheets

BACKLASH PREVENTING STRUCTURE FOR STEERING COLUMN

BACKGROUND OF THE INVENTION

1. Field of the Invention

The present invention relates to a backlash preventing structure for a steering column which is equipped in an automobile.

2. Description of the Related Art

A steering column, which is a device for changing the direction in which an automobile runs, may permit a driver to adjust a steering wheel by tilting the steering wheel in the vertical direction and moving up or down the steering wheel along a steering shaft in order for the driver to ensure an optimal driving posture for his physical constitution.

However, in such a steering column, backlash in a telescopically movable structure would not only give unpleasant feeling to a driver who manipulates a steering wheel, but also cause a degradation in a steering wheel supporting rigidity, so that vibrations of the engine, vibrations of the chassis, when running on an irregular ground, and the like would cause the steering wheel to vibrate, thus spoiling manipulation feeling of the driver, and reducing the commercial value of the automobile itself.

The applicant has therefore proposed a structure for preventing the foregoing backlash (see Laid-open Japanese Utility-Model Registration Application No. 6-74562). The backlash preventing structure is shown in FIGS. 8 and 9.

FIG. 8 is a lateral sectional view of the conventional backlash preventing structure, and FIG. 9 is a cross-sectional view taken along a line C-C in FIG. 8. In these figures, a cylindrical upper jacket 101 is fixed on a chassis, and a cylindrical movable sleeve 102 is slidably fitted on the upper jacket 101. A steering shaft, not shown, is coupled to the movable sleeve 102, and a steering wheel, not shown, is securely connected to one end of the steering shaft.

A square window hole 102a is formed through the top of the movable sleeve 102, and a rectangular plate 103 is fitted into the window hole 102a. The plate 103 has an inner surface formed in an arcuate shape which is in contact with the outer peripheral surface of the upper jacket 101. A protrusion 103a is formed at the center of the inner surface of the plate 103. Then, the protrusion 103a is fitted into an elongated hole 101a of the upper jacket 101, which is formed long in a direction in which it slides, thereby preventing the movable sleeve 102 from rotating and limiting the stroke of the movable sleeve 102.

On the top of the plate 103, a pair of press members 104 are spaced apart from each other, and are urged in directions opposite to each other by a spring 105 interposed between the press members 104. These press members 104 and spring 105 are housed in a cover 106 which is attached to a pair of seats 102b integrally implanted on the edge of the window hole 102a of the movable sleeve 102 with screws 107.

Here, the top of each press member 104 is formed into a tapered surface 104a which is in contact with a tapered region 106a of the cover 106.

Thus, the foregoing plate 103, press members 104, spring 105, cover 106, and screws 107 make up the backlash preventing structure. According to this backlash preventing structure, since the two press members 104 are urged in the directions opposite to each other by the spring 105, the press members 104 act to press the plate 103 onto the upper jacket 101 through a wedging action made by the tapered surface 104a in contact with the tapered region of the cover 106, thus preventing backlash of the movable sleeve 102 with respect to the upper jacket 101.

However, since the foregoing backlash preventing structure requires a total of seven parts, i.e., one plate 103, two press members 107, one spring 105, one cover 106, and two screws 107, these parts cause an increase in cost. Also, since the assembly of the backlash preventing structure involves mounting the two pressing members 104 with the spring 105 kept in a compressed state, dedicated assembling tools must be provided, thus implying a problem with respect to the ease of the assembly of the backlash preventing structure.

Also, the fixation of the plate 103 in the axial direction depends on a frictional force resulting from the urging force of the spring 105, and in principle, the plate 103 is permitted to move in the axial direction, so that during a telescopic operation (a sliding operation of the movable sleeve 102 along the steering shaft), the plate 103 can move in the axial direction to generate hammering noise with the movable sleeve 102.

SUMMARY OF THE INVENTION

The present invention has been made in view of the problems mentioned above, and it is an object of the invention to provide a backlash preventing structure for a steering column which is capable of contributing to a reduction in cost with the employment of a less number of parts and to the ease of assembly, and is also capable of preventing hammering noise.

To achieve the above object, the present invention provides a backlash preventing structure for a steering column which has a cylindrical movable jacket slidably fitted into an outer cylindrical housing having three holes formed therethrough in an axial direction, a steering shaft swingably disposed within the movable jacket, and a steering wheel secured to one end of the steering shaft. The backlash preventing structure, which prevents backlash of the movable jacket against the outer cylindrical housing, includes a pair of press members each fitted into a left or a right side hole of the outer cylindrical housing, and a leaf spring fixed to the outer cylindrical housing with a screw screwed into a central hole of the outer cylindrical housing for urging the press members onto an outer peripheral surface of the movable jacket.

Preferably, in the foregoing structure, each of the press members has a tapered surface inclined in the axial direction, wherein the leaf spring is in contact with the tapered surface of each the press member.

Also preferably, the movable jacket has an elongate hole long in the axial direction, and a leading end of the screw is fitted into the elongate hole.

Further preferably, the movable jacket has an elongate hole long in the axial direction, and at least one of the press members has a protrusion formed thereon and fitted into the elongate hole.

In the backlash preventing structure described above, the press members are directly urged by the leaf spring onto the outer peripheral surface of the movable jacket to effectively prevent backlash of the movable jacket against the outer cylindrical housing. This backlash preventing structure is composed of a total of four parts, i.e., two press members, one leaf spring, and one screw. In assembling these parts into the backlash preventing structure, the two press members are fitted into the associated holes, and covered with the leaf spring from above, and the leaf spring is fixed with the screw, thereby achieving a reduction in the number of parts, an improvement on the ease of assembly, and a resulting reduction in cost.

Since each of the press members has a tapered surface inclined in the axial direction and the leaf spring is in contact with the tapered surface of each the press member, each press member is urged by the leaf spring in the axial direction to block its axial movements, thus preventing the press members from coming into contact with the seat (outer cylindrical housing to generate the hammering noise during a telescopic operation (when the movable jacket is slid along the steering shaft).

The leading end of the screw is fitted into the elongate hole formed through the movable jacket to prevent the movable jacket from rotating and to restrict the stroke thereof.

The protrusion formed on at least one of the press members is fitted into the elongate hole formed through the movable jacket to prevent the movable jacket from rotating and to restrict the stroke thereof.

The above and other objects, features and advantages of the present invention become apparent from the following description when read with reference to the accompanying drawings.

DETAILED DESCRIPTION OF THE EMBODIMENTS

In the following, some embodiments of the present invention will be described with reference to the accompanying drawings.

Figure 1:
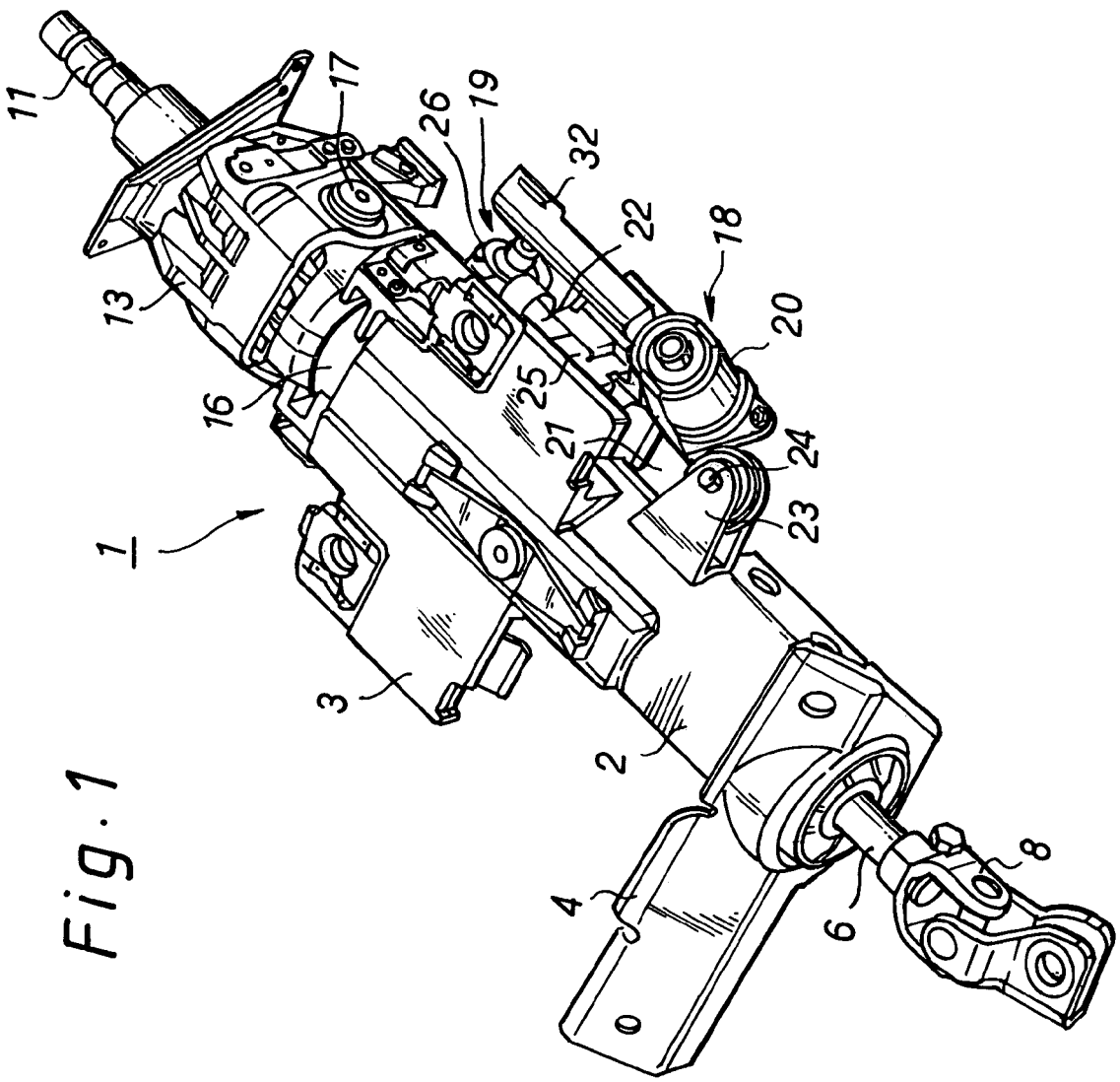
FIG. 1 is a perspective view of a steering column equipped with a backlash preventing structure according to one embodiment of the present invention.
Figure 2:
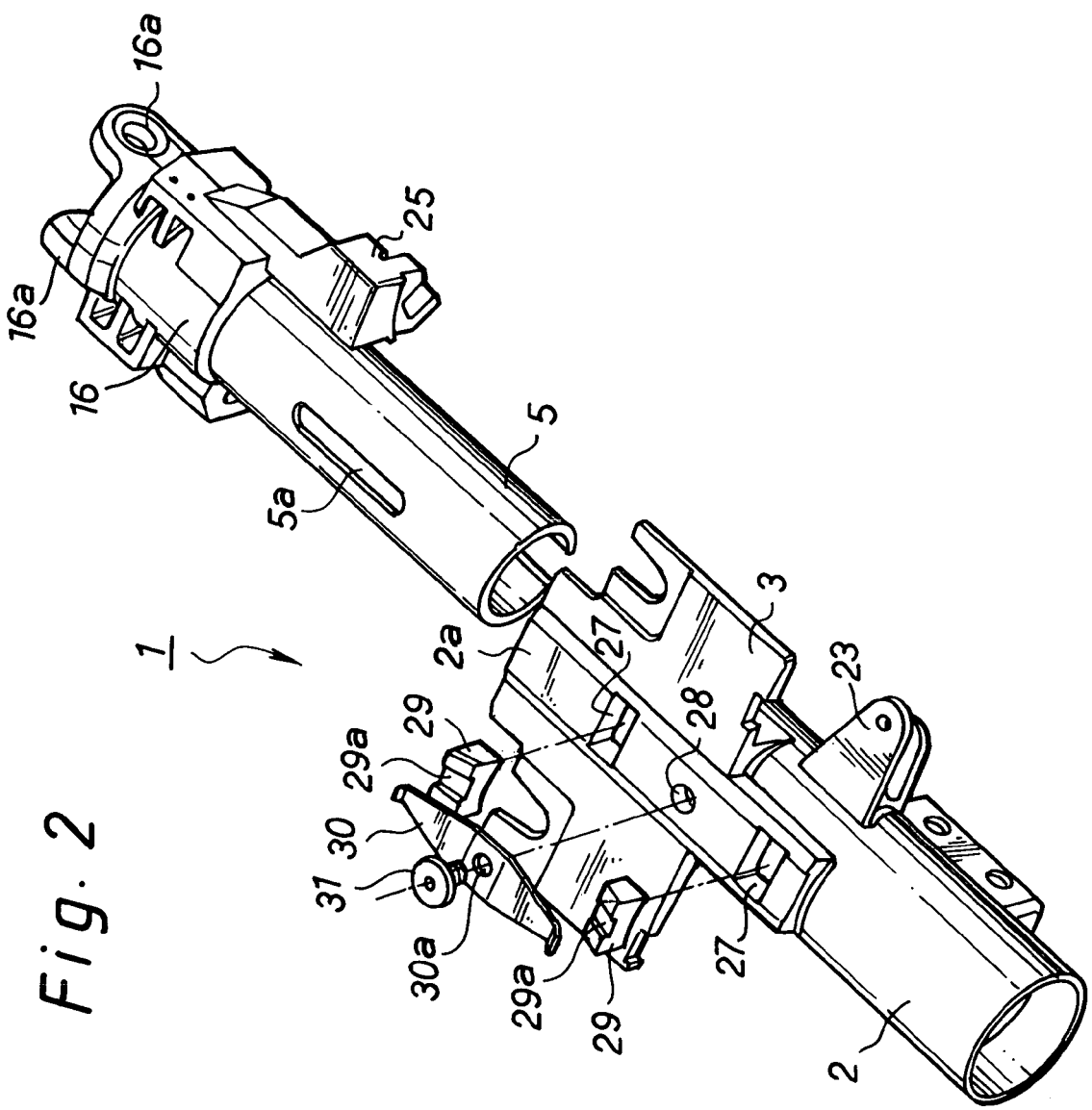
FIG. 2 is an exploded perspective view of the steering column equipped with the backlash preventing structure shown in FIG. 1.
Figure 3:
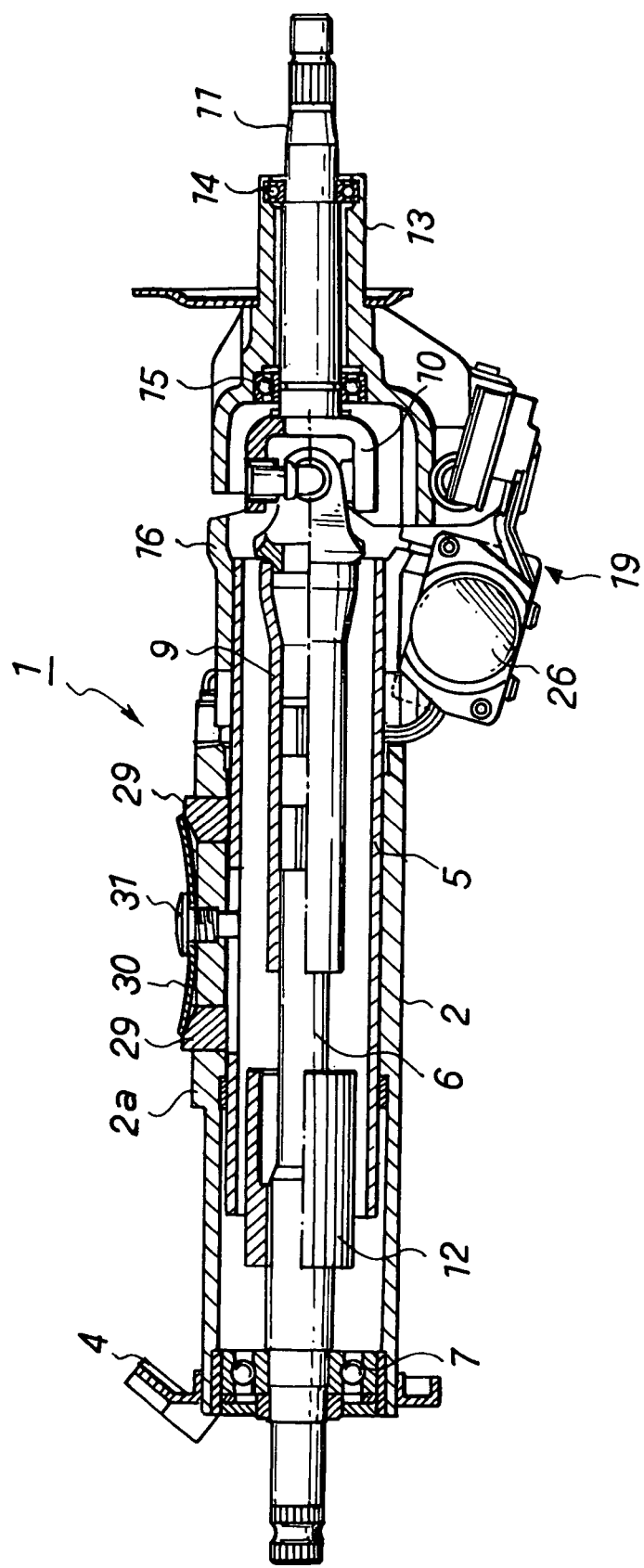
FIG. 3 is a longitudinal sectional view, cut by half, showing part of the steering column equipped with the backlash preventing structure shown in FIG. 1.
Figure 4:
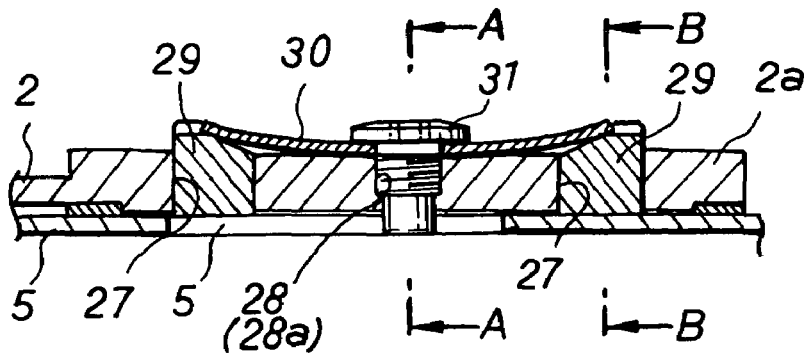
FIG. 4 is a cross-sectional view showing in greater detail the backlash preventing structure according to one embodiment of the present invention.
Figure 5:
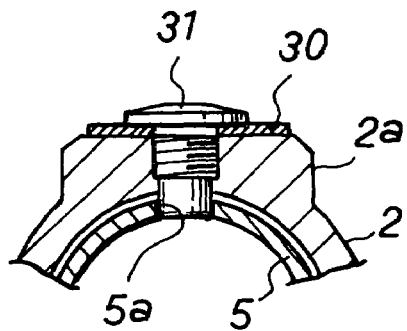
FIG. 5 is a cross-sectional view taken along a line A-A in FIG. 4.
Figure 6:
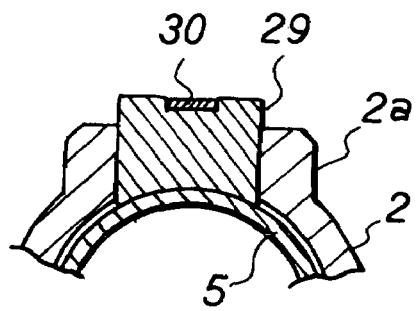
FIG. 6 is a cross-sectional view taken along a line B-B in FIG. 4.

FIG. 1 is a perspective view of a steering column equipped with a backlash preventing structure according to one embodiment of the present invention, FIG. 2 is an exploded perspective view of the steering column, FIG. 3 is a longitudinal cross-sectional view, cut by half, for showing part of the steering column, FIG. 4 is a detailed cross-sectional view of the backlash preventing structure according to one embodiment of the present invention, FIG. 5 is a cross-sectional view taken along a line A-A in FIG. 4, and FIG. 6 is a cross-sectional view taken along a line B-B in FIG. 4.

A steering column 1 for use with a backlash preventing structure according to one embodiment of the present invention can permit a driver to adjust a steering wheel with a motor-driven mechanism by tilting the steering wheel in the vertical direction and/or moving up or down the steering wheel along a steering shaft. The steering column 1 is constructed in the following manner.

Referring specifically to FIG. 1, the steering column 1 comprises an outer cylindrical housing 2 fixed to a chassis of an automobile through upper and lower brackets 3, 4. A cylindrical movable jacket 5 is slidably fitted into the outer cylindrical housing 2.

As can be best seen in FIG. 3, an intermediate shaft 6 is concentrically disposed in the movable jacket 5. The intermediate shaft 6 has a lower end rotatably supported by the inner surface of the outer cylindrical housing 2 through a bearing 7. Then, a lower end portion of the intermediate shaft 6 extending downward from the outer cylindrical housing 2 is coupled to a steering box by an intermediate shaft, not shown, through a universal joint 8 shown in FIG. 1.

Also, as shown in FIG. 3, a cylindrical movable sleeve 9 disposed concentrically with the axis in the movable jacket 5 is axially slidably spline-fitted on the outer peripheral surface of an upper end portion of the intermediate shaft 6 which extends into the movable jacket 5. The upper end of the movable sleeve 9 is coupled to an upper shaft 11 through a universal joint 10. The intermediate shaft 6, movable sleeve 9, and upper shaft 11 make up a steering shaft. A key lock collar 12 is fitted on an intermediate portion of the intermediate shaft 6 which resides in the movable jacket 5.

The upper shaft 11 is inserted through and rotatably supported by a tilt housing 13 by way of a pair of bearings 14, 15. A steering wheel, not shown, is securely connected to the upper end of the upper shaft 11, the lower end of which is coupled to the movable sleeve 9 through the universal joint 10.

A coupling member 16 is fitted on the outer peripheral surface of an upper end portion of the movable jacket 5. As shown in FIG. 2, the coupling member 16 is coupled to the tilt housing 13 by a tilt shaft (bolt) 17 (see FIG. 1) which is inserted through and screwed into a pair of left and right bosses 16a which are integrally formed with the coupling member 16 at a leading end thereof. Therefore, the tilt housing 13 and upper shaft 11 inserted through and supported by the tilt housing 13 are constructed for tilting movements about the tilt shaft 17 in the vertical direction.

In the steering column 1 constructed as described above, the movable jacket 5 and movable sleeve 9 are slid with respect to the outer cylindrical housing 2 by a driving means 18 shown in FIG. 1 to telescopically adjust the steering wheel along the steering shaft. Also, the tilt housing 13 and upper shaft 11 supported thereby are swung up and down about the tilt shaft 17 by a driving means 19 shown in FIGS. 1 and 3 to adjust the steering wheel in tilting in the vertical direction.

One driving means 18 comprises an electric motor 20, as a power source, which is formed with a worm gear on an output shaft thereof. The worm gear meshes with a worm wheel, not shown, secured at one end of a screw shaft 22 inserted into a housing 21. The housing 21, in turn, is swingably coupled to a bracket formed on the outer cylindrical housing 2 by a shaft 24.

A block-shaped slider 25 integrally formed on the coupling member 16 is inserted through and screwed with the screw shaft 22.

The other driving means 19 is also constructed in a manner similar to the driving means 18, and is composed of a worm gear, a worm wheel, a screw shaft, a slider, and the like, not shown, in addition to an electric motor 26 which serves as a power source.

Next, the backlash preventing structure according to one embodiment of the present invention will be described with reference to FIGS. 2 to 5.

As shown in FIGS. 2 and 4, a seat 2a in the shape of a rectangle long in the axial direction, in a plan view, is integrally formed on a portion of the outer peripheral surface of the outer cylindrical housing 2. The seat 2a is formed with two rectangular holes 27, which are long in the axial direction, spaced apart in the axial direction. The seat 2a is also formed with a circular hole 28 in the middle between the rectangular holes 27. The circular hole 28 is formed with a thread 28a (see FIG. 4) on the inner surface thereof.

An elongate hole 5a, long in the axial direction, is formed through a portion of the movable jacket 5 (a portion of the outer cylindrical housing 2 corresponding to the seat 2a).

A block-shaped press member 29 is fitted, from the outside, into each of the two rectangular holes 27 formed through the seat 2a of the outer cylindrical housing 2. These press members 29 are covered with a leaf spring 30 from above. The leaf spring 30 is fixed to the seat 2a with a screw 31 which is screwed into the thread 28a of the circular hole 28. In this way, both press members 29 are pressed onto the outer peripheral surface of the movable jacket 5 with a predetermined force produced by an urging force of the leaf spring 30.

Here, each of the press members 29 has the inner surface formed in the shape of arc in conformity to the curvature of the outer peripheral surface of the movable jacket 5 (see FIG. 6), and the outer surface, with which the leaf spring 30 comes into contact, is formed in a tapered surface which inclines in the axial direction (specifically, the outer surface inclines obliquely upward as it is further away from the screw 31).

As illustrated in FIG. 2, a circular hole 30a is formed at the center of the leaf spring 30 in the lengthwise direction for inserting the screw 31 therethrough. The leaf spring 30 is tapered toward both ends thereof which are in abutment to the tops (tapered surface) of the associated press members 29, so that each press member 29 is pressed onto the outer peripheral surface of the movable jacket 5. The top (tapered surface) of each press member 29 is formed with a fitting groove 29a (see FIG. 2) in a trapezoidal shape, in a plan view, conforming to the shape of the tapered end portion of the leaf spring 30. The tapered end of the leaf spring 30 is fitted into the associated fitting groove 29a.

As illustrated in FIGS. 3 to 5, the leading end of the screw 31, which penetrates into the outer cylindrical housing 2, is fitted into the elongate hole 5a formed through the movable jacket 5.

In the foregoing construction, the backlash preventing structure according to one embodiment of the present invention is made up of the two press members 29, one leaf spring 30, and one screw 31, i.e., a total of four parts.

Next, description will be made on the action of the steering column 1 which is equipped with the backlash preventing structure according to one embodiment of the present invention.

As the driver rotates a steering wheel, not shown, secured to the upper end of the upper shaft 11, the rotation is transmitted to a gear box, not shown, through the upper shaft 11, universal joint 10, movable sleeve 9, and intermediate shaft 6. Then, the rotation is transformed into a wheel steering motion by a steering gear, not shown, contained in the gear box, and a steering link mechanism, not shown, thereby steering the automobile in a predetermined direction.

When the driver wishes to move up or down the steering wheel along the steering shaft in order to maintain an optimal driving posture, the driver manipulates a manipulation button, not shown, to rotate the driving motor 20 of the driving means 18 in any direction. Then, the rotation of the electric motor 20 is transmitted to the screw shaft 22 through the worm gear and worm wheel, not shown, causing the screw shaft 22 to rotate. The rotation of the screw shaft 22 in turn causes the slider 25 and movable jacket 5 to move along the steering shaft. As the movable jacket 5 moves along the steering shaft in this way, the tilt housing 13 coupled to the movable jacket 5 through the coupling member 16 and tilt shaft 17, and the movable sleeve 9 coupled to the upper shaft 11 supported by the tilt housing 14 and steering shaft through the universal joint 10 move in the same direction, resulting in adjustments of the height of the steering wheel, not shown, secured to the upper shaft 11 along the steering shaft. The amount by which the steering wheel is moved up or down is detected by a potentiometer 32 shown in FIG. 1.

According to the backlash preventing structure of the present invention, since the press members 29 are directly pressed onto the outer peripheral surface of the movable jacket 5 by the spring 30, the movable jacket 5 is effectively prevented from backlash with respect to the outer cylindrical housing 2 to avoid giving unpleasant feeling to the driver who manipulates the steering wheel. The backlash preventing structure of the present invention can also prevent a reduced rigidity for supporting the steering wheel, and prevent vibrations of the steering wheel due to vibrations of the engine, vibrations of the chassis when running on an irregular ground, and the like from causing the steering wheel to vibrate. It is therefore possible to maintain good manipulation feeling of the driver, and to increase the commercial value of the automobile itself.

In addition, the backlash preventing structure according to the present invention is made up of a total of four parts, i.e., two press members 29, one leaf spring 30, and one screw 31, and these parts can be assembled only by fitting the two press members 29 into rectangular holes 27, covering the leaf spring 30 on the press members 29 from above, and fixing the leaf spring 30 with the screw 31, thereby achieving a reduction in the number of parts, and an improvement on the ease of assembly. As a result, the present invention realizes the backlash preventing structure, and a reduction in cost of the steering column 1.

Also, in the backlash preventing structure of the present invention, the surface of each press member 29, with which the leaf spring 30 comes into contact, is tapered in the axial direction, so that each press member 29 is urged by the leaf spring 30 in the axial direction (in this embodiment, in the direction in which both press members 29 move away from each other) to block its axial movements, thus preventing the press members 29 from coming into contact with the seat 2a (outer cylindrical housing 2) to generate the hammering noise during a telescopic operation (when the movable jacket 5 is slid along the steering shaft).

Figure 7:
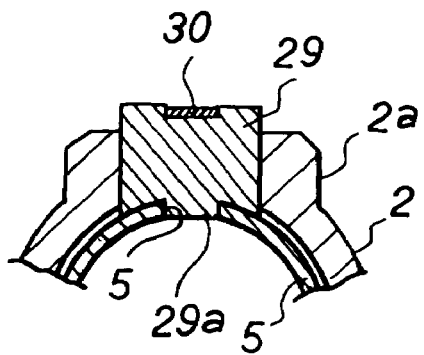
FIG. 7 is a cross-sectional view, similar to FIG. 6, showing a backlash preventing structure according to another embodiment of the present invention.
Figure 8:
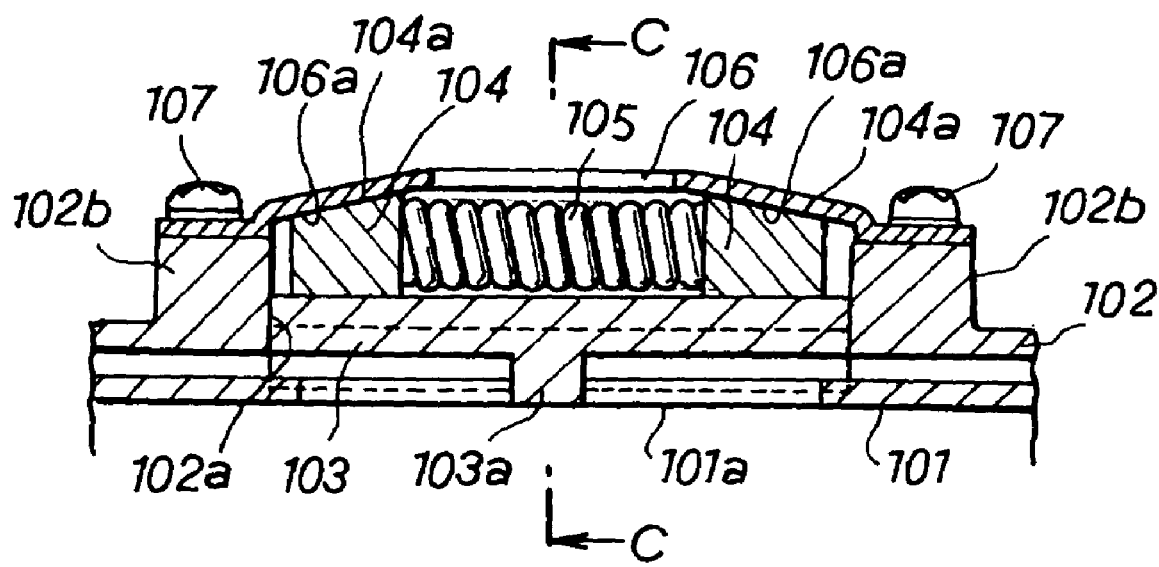
FIG. 8 is a lateral sectional view showing a conventional backlash preventing structure.
Figure 9:
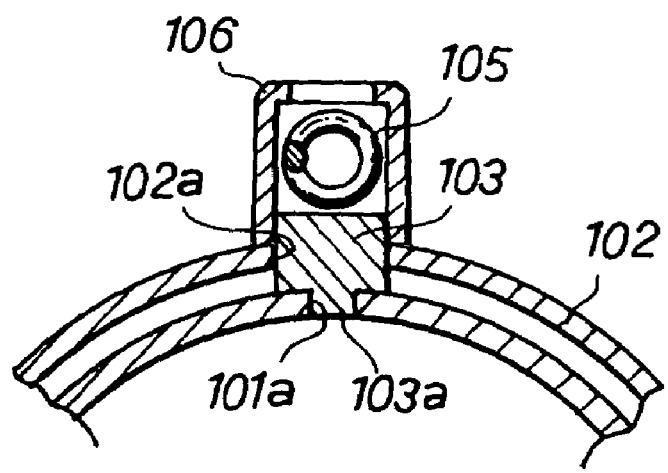
FIG. 9 is a cross-sectional view taken along a line C-C in FIG. 8.

Further, since the leading end of the screw 31 is fitted into the elongate hole 5a formed through the movable jacket 5, the movable jacket 5 is prevented from rotating, and its stroke is limited. Alternatively, as shown in FIG. 7, both or any one of the press members 29 may be formed with a protrusion 29a on the inner surface thereof, such that the protrusion 29a is fitted into the elongate hole 5a formed through the movable jacket 5, thereby making it possible to prevent the movable jacket 5 from rotating and to restrict the stroke thereof.

On the other hand, when the driver wishes to tilt the steering wheel in the vertical direction in order to maintain an optimal driving posture, the driver manipulates a manipulation button, not shown, to rotate the driving motor 26 of the driving means 19 in any direction. Then, the rotation of the electric motor 26 is transmitted to the screw shaft through the worm gear and worm wheel, not shown, to rotate the screw shaft. The rotation of the screw shaft causes the slider, the tilt housing 13 coupled thereto, and the upper shaft 11 inserted through and supported by the tilt housing 13 to tilt up and down about the tilt shaft 17. As a result, the steering wheel, not shown, secured to the upper shaft 11 also tilts up and down to adjust the height position.

While the foregoing description has been made on a particular embodiment in which the present invention is applied to the steering column 1 which has the movable jacket 5 slidably inserted into the outer cylindrical housing 2 fixed to the chassis, the present invention can be likewise applied to a steering column which has the movable jacket 5 fixed to the chassis, and the outer cylindrical housing 2 slidably fitted on the movable jacket 5, in which case the backlash preventing structure is disposed in the outer cylindrical housing 2 which is disposed outside.

As will be appreciated from the foregoing, the present invention can be applied to a steering column for an automobile which can adjust the height of a steering wheel along a steering shaft through a telescopically movable mechanism.

Although some preferred embodiments of the present invention have been shown and described above in detail, it should be understood that various changes and modifications may be made without departing from the spirit and scope of the invention as defined in the appended claims.

What is claimed is:

1. In a steering column having a cylindrical movable jacket slidably fitted into an outer cylindrical housing, a steering shaft swingably disposed within said movable jacket, and a steering wheel secured to one end of said steering shaft, a structure for preventing backlash of said movable jacket against said outer cylindrical housing, said structure comprising:

said outer cylindrical housing having a central, an upper and a lower hole formed therethrough and aligned in an axial direction;

a pair of press members, one each fitted into said upper and lower holes, respectively, of said outer cylindrical housing; and a leaf spring fixed to said outer cylindrical housing with a screw screwed into said central hole of said outer cylindrical housing for urging said press members onto an outer peripheral surface of said movable jacket.

2. A structure according to claim 1, wherein each of said press members has a tapered surface inclined in the axial direction, said leaf spring being in contact with said tapered surface of each said press member.

3. A structure according to claim 1, wherein said movable jacket has an elongate hole in the axial direction thereof, and a leading end of said screw is fitted into said elongate hole.

4. A structure according to claim 1, wherein said movable jacket has an elongate hole in the axial direction thereof, and at least one of said press members has a protrusion formed thereon and fitted into said elongate hole.

* * * * *